Aug. 3, 1954 L. E. BARTON 2,685,661

CATHODE-RAY BEAM DEFLECTION

Filed Sept. 25, 1951 3 Sheets-Sheet 1

INVENTOR
Loy E. Barton
BY [signature]
ATTORNEY

INVENTOR
Loy E. Barton
BY
[signature]
ATTORNEY

Aug. 3, 1954 L. E. BARTON 2,685,661

CATHODE-RAY BEAM DEFLECTION

Filed Sept. 25, 1951 3 Sheets-Sheet 3

INVENTOR
Loy E. Barton
BY
[signature]
ATTORNEY

UNITED STATES PATENT OFFICE 2,685,661

CATHODE-RAY BEAM DEFLECTION

Loy E. Barton, Princeton, N. J., assignor to Radio Corporation of America, a corporation of Delaware Application September 25, 1951, Serial No. 248,256

12 Claims. (Cl. 315—21)

This invention relates generally to the control of electron beams, and particularly to systems for effecting registration of an electron scanning beam by control areas of a target electrode scanned by the beam.

Color television tubes of the cathode ray type have been proposed having a luminescent screen containing a series of horizontal interspersed lines of different colored phosphors. In such tubes it is desirable to cause exact registration of the cathode ray or electron beam with a line of a given color at the start of the scanning line. Otherwise wrong color information would be produced. Accordingly the present invention is directed to means for precisely registering a cathode ray beam at the start of a given sweep line. While it will be appreciated that the present invention is of general utility wherever precision starting of an electron beam is desirable it will be explained in connection with a color television deflection system.

In order to precisely start a cathode ray beam in registration with a desired line in television systems several different kinds of information must be imparted to the beam. In interlaced scanning systems the information is even more complex. Thus a registration system must be capable of providing proper deflection sense and deflection amplitude signals for controlling the position of the beam. This information is preferably given during each scanning line to effectively and precisely prevent diluting or mixing of colors on the tube screen. Further control must also of necessity be provided to maintain the proper sense and amplitude of control voltage during interlaced fields or other changes in the scanning pattern from one field to the next. Accordingly it is desirable to provide a system capable of the maximum amount of control information without requiring too much control circuit complexity.

It has been customary in beam registration systems to provide a control area near the luminescent screen of a cathode ray tube to effect registration. This control area may consist of electron emissive or electron conductive materials which will respond in the formation of a suitable electrical waveform when the electron beam scans the control area. By properly disposing such a control area relative to the scanning path of the electron beam in accordance with the present invention the necessary information may be obtained for improved and precise beam registration.

Accordingly it is an object of the present invention to provide an improved electron-beam registration system.

Another object of the invention is to provide systems capable of controlling registration of an electron beam during each scanning cycle.

Still another object of the invention is to provide improved electron beam registration systems for precise operation during changes in the field scanning pattern.

A further object of the invention is to provide improved control areas for effecting electron beam registration in cathode ray tubes.

The invention therefore comprises in one embodiment utilized for describing the invention and its mode of operation a cathode ray tube having a control area with a pair of separated surfaces or conductive lines extending in a generally perpendicular direction to the line scanning pattern of the electron beam. One of the conductive lines is zig-zagged to provide a variable time differential between the lines depending upon the relative position of the beam to the desired scanning line. Thus a control signal may be developed by a timing circuit to control the position of the electron beam. The zig-zag line may further have portions of different width to provide a sensing control wave for the electron beam responsive to a pulse width distinguishing circuit. Thus, the beam is precisely positioned in proper sense and amplitude in accordance with the invention.

The novel features that are considered characteristic of the invention are set forth with particularity in the appended claims. The invention itself, however, both as to its organization and mode of operation along with additional objects and advantages thereof will best be understood from a consideration of the following description in conjunction with the accompanying drawings, in which:

Figure 3:
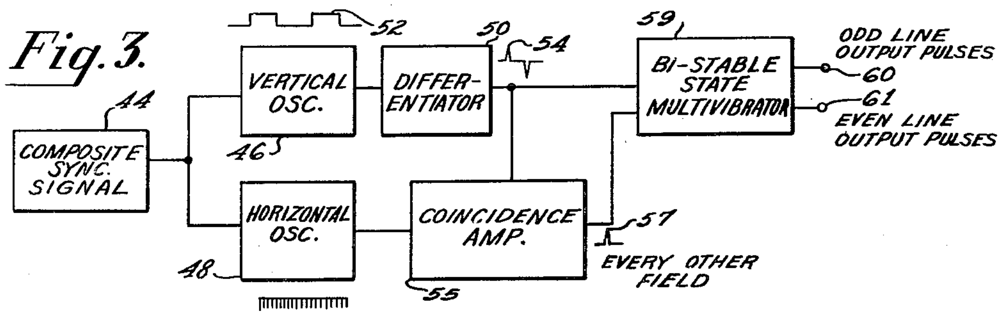
Figure 3 is a block diagram of a circuit of the invention for distinguishing between changes in the field scanning pattern.
Figure 4:
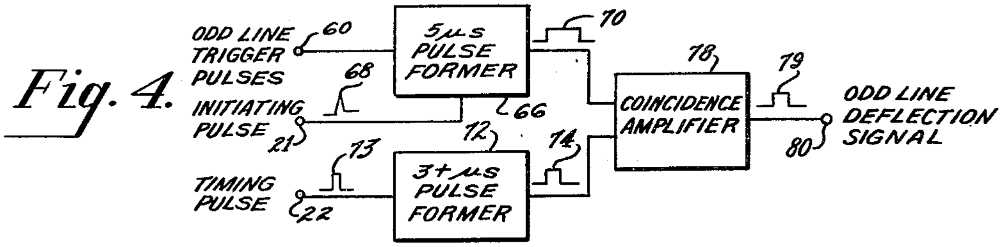
Figures 3A, 5:
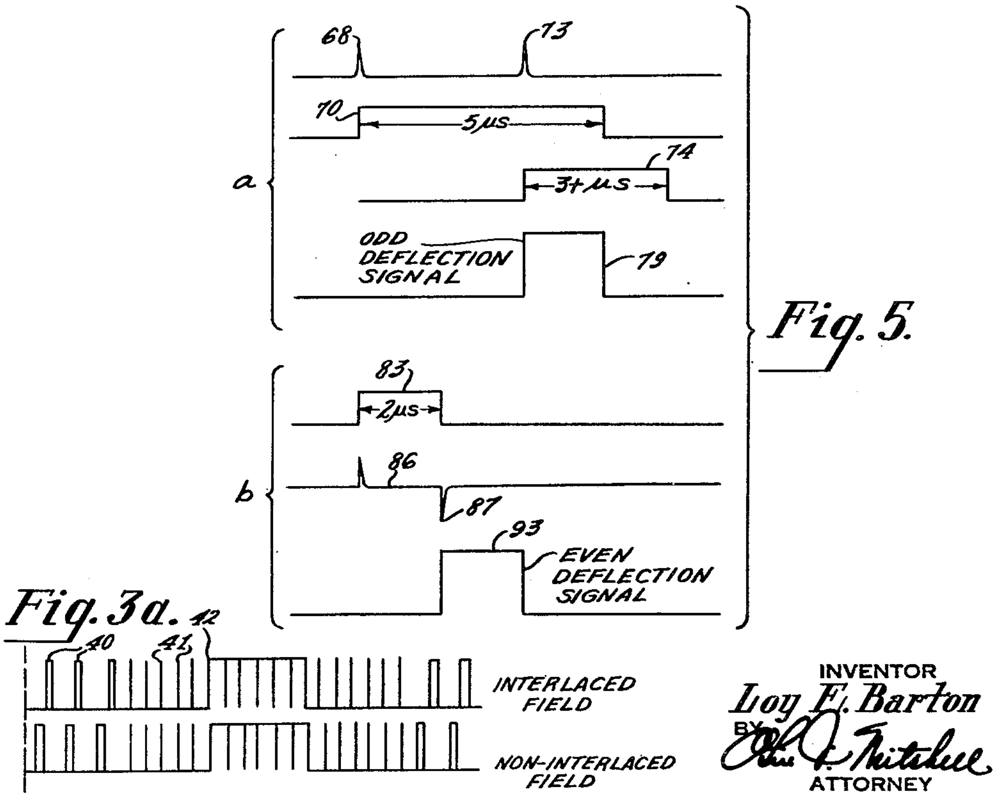
Figure 6:
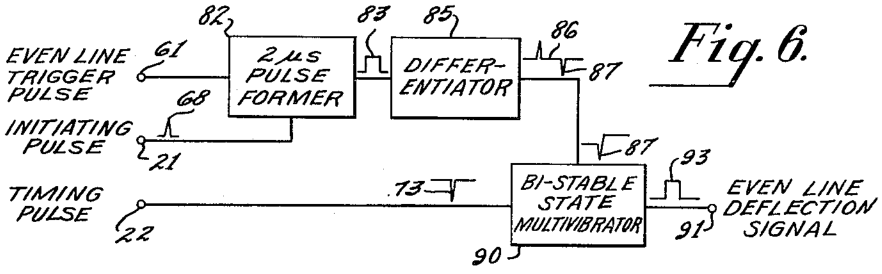
Figure 7:
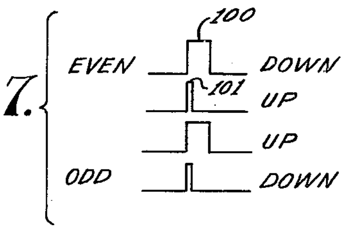
Figure 8:
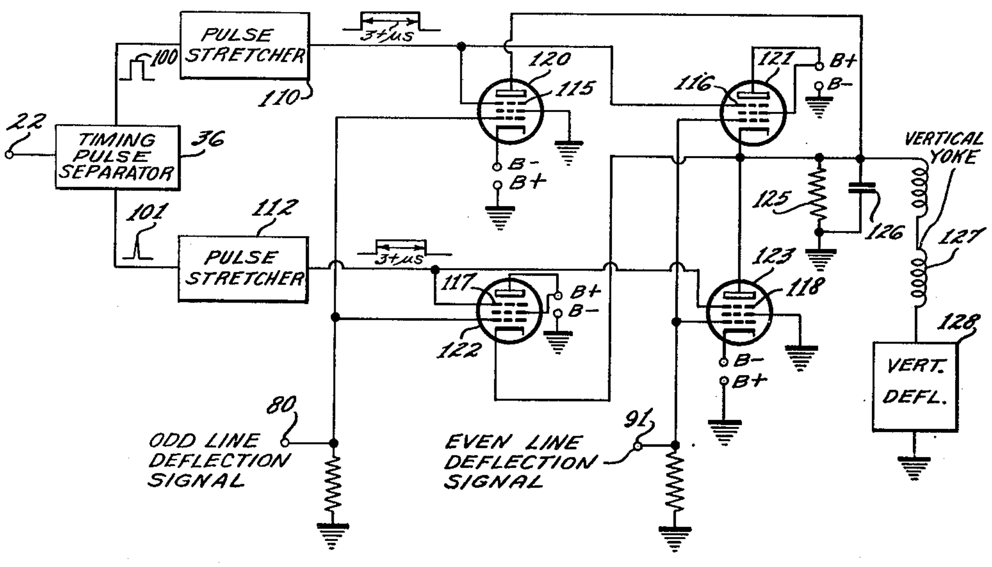

Figure 3*a* is a waveform chart for illustrating the operation of the circuit of Figure 3;

Figure 4 is a block diagram of a circuit constructed in accordance with the invention to provide beam registration control signals for one type of field scanning pattern;

Figure 5 is a waveform diagram chart for illustrating operation of certain circuits of the invention;

Figure 6 is a block diagram of a circuit constructed in accordance with the invention to provide beam registration control signals for a further type of field scanning pattern;

Figure 7 is a waveform diagram for illustrating the mode of operation of the invention with two different types of field scanning patterns; and, Figure 8 is a schematic circuit diagram, partially in block, of a circuit of the invention for effecting electron beam registration in accordance with appropriate control signals.

Figure 1:
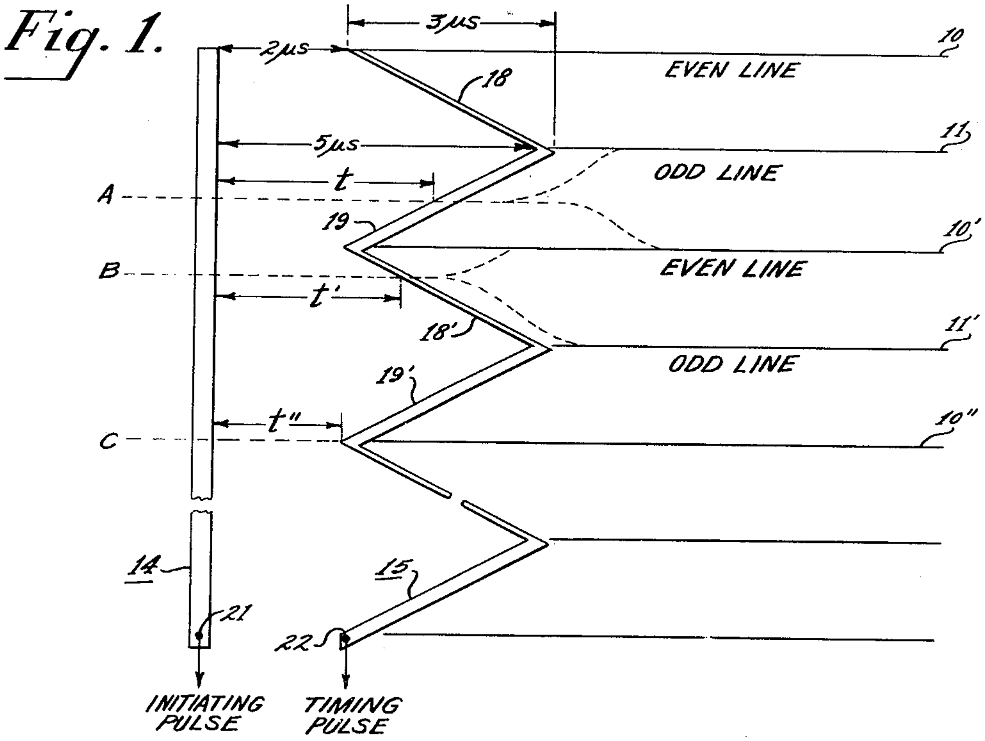
Figure 1 is a diagrammatic representation of a section of a cathode ray screen raster area and accompanying control area constructed in accordance with the invention.

Now referring to the drawings and in particular to Figure 1, a section of the shown cathode ray screen raster area contains the sets of desired scanning lines 10, 11 such as might be ruled lines of colored phosphor material. The lines 10 are designated "even" and the lines 11 are designated "odd" to indicate the desired beam scanning lines for two different types of field scanning patterns. Thus, lines 10 and 11 constitute adjacent lines in any given field. For purposes of illustration and not limitation these two field scanning patterns will arbitrarily be respectively called hereinafter interlaced and noninterlaced fields to correspond with the presently adopted United States television signal standards.

A control area distinct from the raster area is provided by the two separated conductive surfaces 14 and 15 extending in a generally perpendicular direction to the scanning lines 10 and 11. As the electron beam scans in a first direction along the lines 10 and 11 it traverses both the control and raster areas. Each field is scanned in the usual manner in a second direction perpendicular to the lines 10 and 11 so that the beam progresses vertically along the raster area. Accordingly the conductive surfaces 14 and 15 respond to the bombardment of the electron beam during each line scansion period at the position the beam crosses the conductors 14 and 15 to provide a pulse or waveform of a shape corresponding to the shape of the conductor surface.

The waveform is dependent upon the energy of the electron beam and its scanning velocity as well and the surfaces are preferably about .001 to .003 inch wide in existing television systems having a line duration of about 67 microseconds ($\mu$sec.). The normal blanking time for the beam at the finish of its scansion to return and begin the next line is about eight $\mu$sec. During the return time the scanning velocity of the beam is so high that there is no appreciable energy caused by bombardment of the beam upon the control surfaces 14 and 15.

It is expected that the spot be started on its line scansion after an elapsed time of about five $\mu$sec. Allowing about one $\mu$sec. for the beam to get started, the first conductor 14 is placed at such position near the extreme left face of the tube to provide an initiating control pulse. The second conductor 15 is zig-zagged between a position from two to five $\mu$sec. of beam travel time from the initiating conductor 14. The zigs and zags of the conductor 15 may be extended between the even and odd lines 10 and 11 for operation in conjunction with interlaced line systems. However, if interlacing is not used, effective control could be attained with a sloped line extending over several lines in accordance with the teachings of this invention.

The zig-zag line conductor 15 has alternate zig and zag portions 18, 19 thereof of different respective widths. Thus, bombardment by the electron beam will indicate by appropriate resulting pulse widths derived from conductor 15 the vertical position of the beam on either side of the desired horizontal scanning line and therefore affords sensing information. It is assumed in this connection that the accuracy of the vertical deflection system used is such that the deflection error is not greater than one frame line in either direction. The zig-zag line 15 also affords a timing indication with respect to the position of the initiating pulse line 14 as a function of the vertical position of the beam with respect to the desired horizontal scanning line. This timing indication is therefore a function of the desired correcting deflection amplitude. Accordingly the described control area provides for one set of lines in inverse function of the deflection amplitude required and for the other set of lines a direct function for operating beam registration control circuits which will hereinafter be described. It is to be recognized that the control surfaces 14 and 15 are not limited to conductive surfaces although they are preferred for simplicity, but may be electron emissive or may by other means provide the necessary control waveform without departing from the concept of the invention. Further it is to be recognized that the control "lines" 14 and 15 have appreciable width and therefore that the terms "line" and "area" are used throughout the present description in a somewhat synonymous manner.

Typical dotted line electron beam trajectories A, B and C are shown during the registration control period. Thus beam A traverses the wider section 19 of the timing line 15 near the center of horizontal deflection lines 11 and 10'. An elapsed time of "$t$" results while the beam passes between lines 14 and 15, which is a function of the deflection amplitude necessary to register the beam. With the wider section 19, a wider pulse at the timing pulse terminal 22 is developed, which may be used along with a field distinguishing synchronizing signal to provide the proper registration sense and cause the beam to be deflected either to the odd line 11 or the even line 10'.

As will hereinafter be more fully explained in connection with the circuit diagrams, the invention provides for automatically causing the proper amplitude of deflection during both interlaced or non-interlaced fields when the beam is deflected respectively to odd or even lines. Consider, however, the beam as it traverses path "B." The corresponding time $t'$ will be directly proportional to the amplitude requisites for registering with even line 10' and inversely proportional to those for registering with odd line 11'. Because of the zig-zag line 15 and the registration of the even lines with the apices nearest the line 14 this condition is inherent in the selection of the preferred line configuration shown, and such configuration together with the spacing of lines 14 and 15 will provide the required elapsed time of traversal of the electron beam so that it is inversely proportional to the misregistration of the beam to a line on one side of the beam and directly proportional to the misregistration of the beam to a line on the other side of the beam.

In accordance with the invention therefore deflection registration circuitry is simplified during interlaced operation or other operation wherein two sets of deflection lines are provided with each set corresponding to a different deflection mode. Thus, means for distinguishing between the modes of operation may readily be provided to afford deflection correction of the proper sense, and the amplitude of correction is available either as a direct or an inverse function for the proper correction control signal amplitude.

Figure 2:
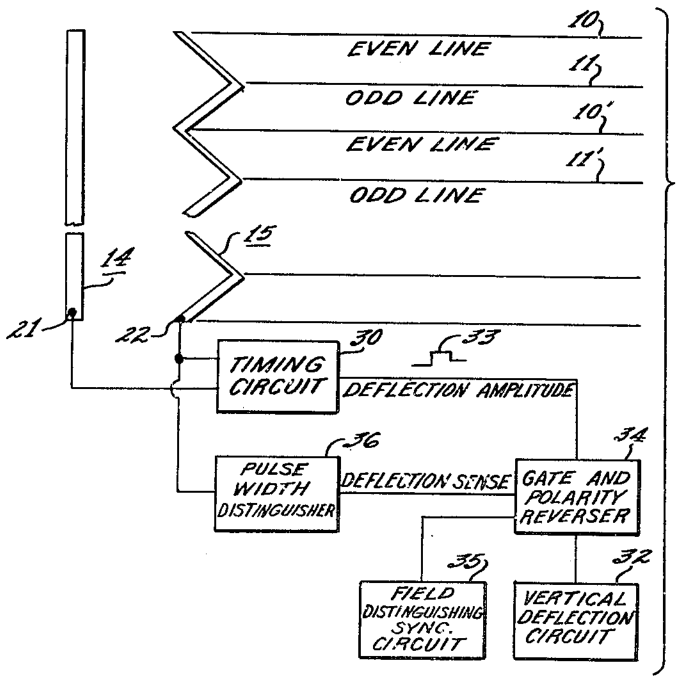
Figure 2 is a block diagram of the beam registration control circuit of the invention as operative together with the cathode ray screen control area.

A control circuit for the registration system of this invention is shown in block diagram form in Figure 2, wherein a timing circuit 30 is shown connected between terminals 21 and 22 located respectively on the initiating line 14 and timing line 15. The timing circuit 30 provides an output pulse having a width or energy content proportional to the traversal time of the electron beam between lines 14 and 15. A multivibrator of the bi-stable type might be used for example to obtain a pulse having a width proportional to the traversal time of the beam. In this case the output pulse is obtained from one stage of operation which is keyed on by the initiating pulse and keyed off by the timing pulse. Thus, the deflection amplitude is controlled by a correction pulse having an energy content as a function of the difference in the path traversed by the beam between the lines 14 and 15, which as before mentioned is a function of the desired deflection amplitude. The resulting control pulse 33 may be inserted in the proper sense and amplitude a conventional vertical deflection circuit 32 by one skilled in the art to effect the desired deflection correction and cause registration of the beam with the desired deflection lines 10 and 11.

When two different deflection modes are utilized as in line interlaced scanning, the correction voltage must be applied in a different sense during each deflection anode. Accordingly a gate and polarity reverser circuit 34 is connected between the timing circuit 30 and deflection circuit 32. A detailed circuit will be described hereinafter in connection with Figure 8 to fully disclose the construction and mode of operation of one embodiment of this part of the invention.

To properly gate and select polarity of the deflection control pulse 33 during each mode of operation, the polarity reverser circuit 34 is connected with a field distinguishing synchronizing circuit 35, of which one embodiment is shown in Figure 3 as will be described in greater detail hereinafter.

The information also necessary in a registration control system to determine the deflection sense is provided by the pulse width distinguishing means 36 connected to the terminal 22 on zigzag line 15. This circuit may be of the type shown and described in United States Patent 2,177,723, issued October 31, 1939 to the assignees of the present invention, or any other suitable circuit desirable to those skilled in the art to provide a waveform distinguishing between the wide and narrow pulses available at terminal 22. The output waveform provided by this circuit 36 therefore is suitable for operating the gating circuit 34 to provide a change in polarity of the deflection sense in accordance to the wide or narrow pulses generated at line 15 by the electron beam. With the desired deflection amplitude control information being a function of the beam traversal time for either mode of operation as hereinbefore explained, the synchronizing circuit 35 need operate only upon the gate and polarity reverser circuit 34 to provide proper registration during interlaced operation.

To obtain the proper synchronization so that odd and even lines 10, 11 may be distinguished and the deflection correction circuit may properly direct the electron beam into registration, the synchronizing circuit must distinguish between interlaced and non-interlaced fields. Referring therefore conjointly to the waveform diagram in Figure 3*a* and the block circuit diagram of Figure 3, the manner of operation of one circuit embodiment of this type is hereinafter explained.

Typical standard television waveforms during successive vertical synchronizing intervals are shown in Figure 3*a*. These waveforms are arbitrarily termed "interlaced field" and "non-interlaced field" to correspond to the even and odd lines 11, 12 for purposes of clear description of circuit operation. It is noted that during the both fields the horizontal pulses 40 are separated by twice the time interval of the equalizing pulses 41. The last horizontal pulse in the interlaced field therefore is half a horizontal pulse interval from the start of the equalizing pulse period, whereas in the non-interlaced field it is a full horizontal pulse interval therefrom. Counting over from the last horizontal pulse to the start of the vertical synchronizing pulse 42, the same relationship holds true. That is, if the horizontal pulses were continued, one horizontal pulse would not coincide with the start of the vertical synchronizing pulse on the interlaced field but would on the non-interlaced field.

Accordingly the block diagram circuit of Figure 3 illustrates the manner of using conventional component circuits, most of which are already used in a television circuit, for obtaining the field distinguishing synchronizing pulses. In the conventional receiver circuit there is provided a circuit 44 for deriving from the video waveform a composite synchronizing signal, and both a vertical oscillator 46 and horizontal oscillator 48 driven synchronously therefrom. Thus by differentiating in circuit 50 the vertical pulses 52 a control pulse 54 is provided coinciding with the leading edge of the vertical synchronizing pulse 42 as shown in Figure 3*a*. A conventional coincidence amplifier circuit 55 having two input pulses derived respectively from the horizontal oscillator 48 and the differentiator circuit 50 will provide a control pulse 57 at the start of every other field, when the vertical and horizontal pulses coincide, as hereinbefore explained.

Thus, the bi-stable state multivibrator circuit 59 will have developed respectively odd line and even line output or trigger pulses at terminals 60 and 61, each pulse having a fixed duration of an entire field. It is noted in this respect that although the control pulse 54 is inserted at multivibrator 59 at the start of each field, it will be ineffective in changing the state of operation of the multivibrator unless it is set up in the opposite state of operation, as well known by those skilled in the art, and therefore is not objectionable.

With the field distinguishing trigger pulses thus available in conjunction with the initiating and timing pulses from the registration control area, all the requisite information is available for deriving the deflection correction signals. The block circuit diagram of Figure 4 therefore illustrates one means of deriving odd line deflection signals in accordance with the invention as hereinafter described in connection with the waveform diagrams in Figure 5*a*.

A one-shot oscillator pulse forming circuit 66 providing a five μsec. output pulse has circuit constants so chosen that it is biased off during the even line fields and is triggered on during odd line fields by a signal at terminal 60. Such a circuit might be, for example, a van der Pol relaxation oscillator as described on page 418 of Electron Tube Circuits, first edition, by S. Seely, published by McGraw-Hill Book Co., Inc. in 1950. The odd line trigger pulses may therefore arrive at terminal 60 in positive polarity to gate the pulse forming circuit 66 for operation in accordance with an initiating pulse 68 taken from terminal 21 on the initiating line 14 (in Figure 1). An output pulse 70 is therefore formed having a duration of five μsec., which is the maximum beam traversal time between the initiating line 14 and the timing line 15.

Connected also to the timing line 15 at terminal 22 is the pulse forming circuit 72 which operates from an input pulse 73 to form an output pulse 74 of at least three μsec. duration. This pulse forming circuit may be the same type as that described above. The time is not critical as will become clear hereinafter but must be at least three microseconds to operate with the control area configurations of the presently described embodiment of the invention.

Portions of waveforms 70 and 74 occurring in coincidence are amplified by circuit 78 to provide an odd line deflection signal 79 at terminal 80. The pulse width and therefore the energy content of this signal will therefore be inversely proportional to the beam traversal time between lines 14 and 15 and is proportional to the vertical distance of the electron beam away from the desired odd line deflection path. Considering Figure 5*a*, where the waveforms are lined up in chronological order from left to right, it is seen that the initiating pulse 68 causes the five μsec. oscillator 66 to form pulse 70. Likewise the timing pulse 73 initiates the three μsec. oscillator 72 to form pulse 74, and thus permits the coincidence amplifier 78 to conduct only during the period of pulse 79 when both the oscillator pulses coincide. This pulse 79 therefore has a width proportional to the difference in time between the time the beam crosses the timing control line 15 and the end of the five μsec. oscillation. Accordingly the control pulse energy is an inverse function of the elapsed time of beam travel between the control lines 14 and 15.

To obtain a pulse energy which is a direct function of the elapsed beam travel time between the control lines 14 and 15, the block diagram circuit of Figure 6 is provided, which is explained conjointly with the waveforms of Figure 5*b*. A further pulse former circuit 82 having an output pulse 83 of two μsec. duration is provided. This circuit 82 similarly is keyed by the initiating pulse 68 when even line trigger pulses coincidently arrive at terminal 61. The output pulse 83 is however differentiated by circuit 85 to form waveform 86 with the trailing edge at 87. The trailing edge pulse 87 then triggers the bi-stable state multivibrator 90 to that state of operation providing an even line deflection output pulse 93 at terminal 91. Thus pulse 87 at the end of two μsec., which occurs after the beam passes line 14, or at the minimum beam traversal time between lines 14 and 15, determines the start of the deflection waveform 93. The timing pulse 73 then keys the multivibrator 90 into its other state of operation and terminates the deflection waveform 93. This waveform 93 therefore is a direct function of the beam traversal time between the control lines 14 and 15 and thus provides a deflection signal of opposite sense information to that of Figure 4.

When only one mode of deflection is utilized it is clear that the oscillators 66 and 82 need not be keyed by the odd or even line trigger pulses and the circuit of Figure 3 is not necessary. Further obvious simplification of later described circuitry may also be effected. However, the described system is preferred to operate systems according to presently accepted United States standard television signals. Also many other circuits may be utilized for obtaining the deflection control waveforms of the invention, and the circuits are described for purpose of illustration of the invention rather than limitation.

To better understand the requisite sensing information consider together Figures 1 and 7. During the beam traverse path "A," the wider pulse 100 derived from the timing line section 19 would indicate that deflection correction should be in the downward sense for even fields or in the upward sense for odd fields. Conversely during beam traverse path B, the narrower pulse 101 derived from the timing line section 18′ designates an upward sense for even fields and a downward sense for odd fields. Accordingly the desired sensing information may be imparted to the vertical deflection circuit of the electron beam by a gate and polarity reversing circuit such as block 34 in Figure 2 or the circuit of Figure 8.

In Figure 8 the timing pulse separator 36 provides at pulse stretcher circuit 110 the wide pulses 100, and also provides at a further pulse stretcher circuit 112 the narrow pulses 101. Each of these pulse stretcher circuits provides an output pulse width of at least three μsec. in order to key the respective gating tube suppressor grids 115, 116, 117 and 118 during the entire deflection correction signal which has a maximum duration of three μsec. in the presently described embodiment.

Four registration control or gating and polarity reversing tubes 120, 121, 122 and 123 are utilized with a common output impedance comprising resistor 125 and shunt capacitor 126. The correction voltage is thus developed in a direct current circuit connected in series with the vertical deflection yoke 127 and the vertical deflection circuit 128. It is obvious therefore that a direct current potential will change the vertical deflection current level in such a manner as to correct for mis-registration if the deflection control potentials at resistor 125 are of the proper sense and magnitude. To effect a correction during the entire line and to prevent the deflection circuits from misregistering by more than a single line the resistor 125 and capacitor 126 preferably have a time constant in the order of several deflection line periods, thereby maintaining an average correction potential which may readily be corrected during the beginning of each line scansion period by a relatively small amount.

In obtaining the proper sense of conduction of the registration control tubes, the upper two tubes 120 and 121 are gated on by the suppressor grid only when the wide pulse 100 occurs. Each of the registration control tubes is a coincidence amplifier initiated by simultaneous signals of the proper polarity on the control and suppressor grids. The potentials and operating conditions of such tubes may readily be determined by those skilled in the art to effect the control conditions taught by the invention and are therefore not described in detail for the purpose of simplicity. The lower two registration control tubes 122 and 123 are conversely gated on by a signal to the suppressor grid only when the narrow pulse 101 occurs.

Thus, by connecting the above described odd line deflection signal at terminal 80 in the control grid circuit of the two left hand control tubes 120 and 122 an output control potential is obtained in resistor 125 corresponding to the requirements of the chart in Figure 7 where a positive potential at the top of resistor 125 causes the controlled beam to deflect downwardly. The magnitude of the control potential will be determined by the length of the odd line deflection signal as the tubes are gated on during the entire period thereof. In order to effect the two polarities of deflection potential at resistor 125, as effected by the described embodiment of the invention, two B supply sources are necessary. One source therefore has its positive terminal grounded. Thereby the single resistor 125 in the deflection circuit may develop the required potential by discharge current in one of the deflection control tubes.

In this respect one B supply source has terminals connected in the cathode circuit of tube 120 whereas the other B supply source has terminals connected in the anode circuit of tube 122. Therefore tube 120 will provide an upwardly sensed deflection potential in accordance with deflection signals at terminal 80 only when the wide pulse 100 is present. Conversely a downwardly sensed deflection potential is only provided when the narrow pulse 101 is present.

In the same manner tubes 121 and 123 effect the reversed polarity deflection potentials when even line deflection signals arrive at terminal 91. Therefore the present invention provides a complete operative system for effecting registration of an electron scanning beam along a desired scanning path. The invention also provides certain novel sub-elements useful in the system including the improved configuration of an electron beam registration control area. Having thus described the invention and its mode of operation, the features which are believed novel are defined with particularity in the appended claims.

What is claimed is:

1. In a deflection system, a cathode ray device containing a raster area and a control area distinct from said raster area, said areas being scanned by the cathode ray in a first direction in fixed lines extending through both areas and in a second direction in fields, said control area comprising a pair of separated surfaces extending in a generally perpendicular direction to said lines, the first of said pair of surfaces having a boundary thereof varying in spacing with respect to said second surface such that predetermined spacing variations correspond to desired paths of cathode ray beam travel, and beam positioning circuits responsive to electron bombardment on said surfaces to control the position of the cathode ray beam with respect to said lines.

2. In a deflection system a cathode ray device containing a raster area and a control area distinct from said raster area, said areas being scanned by the cathode ray in a first direction in fixed lines extending through both areas and in a second direction in fields, said control area comprising a pair of separated surfaces extending in a generally perpendicular direction to said lines, one surface comprising a substantially straight line and the other surface comprising a zig-zag line, and beam positioning circuits responsive to electron bombardment on said surfaces to control the position of the cathode ray beam with respect to said lines.

3. A system as defined in claim 2 wherein the one surface is of constant width, the other surface is of different width respectively in the zig and zag portions thereof, and the beam positioning circuits are responsive to both the variation of pulse widths obtained by electron bombardment in said other surface and the time difference in the path traversed by the beam between the one surface and the other surface.

4. A system for registering cathode ray beams along a deflection path crossing a control area having a substantially straight line and a separate zig-zag line extending generally perpendicular to said path comprising, a timing circuit connected to both said lines, and beam positioning means responsive to said timing circuit to control the position of the beam in said path.

5. A system as defined in claim 4 wherein said beam positioning means determines the amplitude of beam positioning in accordance with the timing circuit and said zig-zag line is of different width respectively in the zig and zag portions thereof, a pulse width distinguishing circuit is connected to said zig-zag line, and said beam positioning means is connected also to said pulse width circuit to thereby control the sense of beam positioning.

6. A system as defined in claim 5 wherein the system is adapted for line interlaced deflection, including a cathode ray synchronizing circuit, means operated by said synchronizing circuit connected to reverse the sense of beam positioning during interlaced deflection periods.

7. A system for registering cathode ray beams along a deflection path crossing a control area having a zig-zag line of different width respectively in the zig and zag portions thereof, a pulse width distinguishing circuit connected to said line, and beam positioning means responsive to said pulse width circuit to control the position of the beam in said path.

8. In a system for registering a cathode ray beam along a deflection path crossing a control area having an initiating area, means distinguishing between interlaced and non-interlaced fields, a one-shot oscillator connected to said means and said initiating area to thereby become initiated for a pulse of fixed width only during said interlaced field as said beam crosses said initiating area, a second one-shot oscillator connected to said means and said initiating area to thereby become initiated for a pulse of different fixed width than said first mentioned pulse only during said non-interlaced fields as said beam crosses said initiating area, means in said control area for determining beam registration as a function of elapsed time after said beam crosses said initiating area, and means for comparing said pulse widths with the elapsed time to derive a control signal for registering said beam.

9. In a system for registering a cathode ray beam along a deflection path crossing a control area having an initiating portion and a timing portion, the boundaries of which are separated by varying distances, said timing portion itself being of varying width, means connected to said initiating portion providing a pulse of fixed width as said beam crosses said initiating area, means connected with said timing portion and coupled with said last named means for determining the elapsed time between the instant the beam crosses said initiating area and contacts said timing area, said last named means including pulse forming means responsive to the width of the timing portion of said control area, and means coupled with said control area portion for comparing said pulse widths with the elapsed time to derive a control signal for registering said beam.

10. In a cathode ray tube, a cathode ray beam target means including a conductive control surface area for supplying information capable of being used in registering the cathode ray beam for deflection in a fixed direction along said target comprising: an initiating area substantially rectangular in shape having a short dimension axis of revolution and a long dimension axis of revolution disposed with its long dimension axis substantially perpendicular to said fixed direction of beam deflection, and an area substantially zigzag in pattern conductively separated from said rectangular area and disposed relative thereto such that straight lines connecting the apices of said zigzag area are substantially parallel to the long dimension axis of said rectangular area.

11. A system as defined in claim 14 wherein said means operative to provide deflection correction amplitude control signals comprise respectively a pair of one-shot oscillators providing output pulses of different widths, one pulse width being in the order of the maximum elapsed traversal time of said beam between said areas and the other pulse width being in the order of the minimum elapsed time of said beam between said areas, means for triggering both said oscillators with a control pulse from said initiating area, means for subtracting from the output pulse of the one oscillator having the greatest width output pulse the elapsed time of the beam between said areas to provide a remainder pulse having a width proportional to the desired inverse function deflection correction control potential, and means for deriving a further pulse of a width proportional to the elapsed time between the end of the shorter oscillator pulse and the time at which the cathode ray beam traverses said timing area to effect the further desired direct function correction control potential.

12. In a system for registering a beam in a series of fixed direction lines along a deflection path crossing a control area, a control area comprising in combination, an initiating area comprising a line substantially perpendicular to said deflection lines, and a timing area comprising a zigzag line separated from said initiating area and generally parallel therewith and disposed relative to said fixed deflection lines such that the apices of said zigzag line are in substantial registration with said deflection lines.

References Cited in the file of this patent

UNITED STATES PATENTS

| Number | Name | Date |
|---|---|---|
| 1,976,400 | Ilberg | Oct. 9, 1934 |
| 2,171,939 | Kucher | Sept. 5, 1939 |
| 2,186,393 | Ring et al. | Jan. 9, 1940 |
| 2,417,450 | Sears | Mar. 18, 1947 |
| 2,530,431 | Huffman | Nov. 21, 1950 |
| 2,540,016 | Sunstein | Jan. 30, 1951 |